Oct. 22, 1935. J. G. DINTILHAC Re. 19,728

THERMOSTATIC RADIATOR CONTROL

Original Filed Oct. 11, 1932 3 Sheets-Sheet 1

Inventor:
Jean Georges Dintilhac.
Attorney:
Conway V. Coe

THERMOSTATIC RADIATOR CONTROL

Original Filed Oct. 11, 1932 3 Sheets-Sheet 2

Inventor:
Jean Georges Dintilhac
Attorney:
Cornwall V. Cox

Oct. 22, 1935. J. G. DINTILHAC Re. 19,728

THERMOSTATIC RADIATOR CONTROL

Original Filed Oct. 11, 1932 3 Sheets-Sheet 3

Inventor:
Jean Georges Dintilhac
Attorney:
Lawrence J. Cole

Reissued Oct. 22, 1935 Re. 19,728

UNITED STATES PATENT OFFICE 19,728

THERMOSTATIC RADIATOR CONTROL

Jean Georges Dintilhac, Paris, France, assignor to Society "Yacco S. A. F.", Paris, France Original No. 1,949,009, dated February 27, 1934, Serial No. 637,349, October 11, 1932. Application for reissue November 17, 1934, Serial No. 753,554. In Belgium August 23, 1932

7 Claims. (Cl. 236—35)

The present invention relates to thermostatic radiator controls, and more particularly to those of the type designed to be used with airplane and automobile motors.

Many devices have been suggested for covering the radiators of such vehicles with curtains, shutters or other structures which may be adjusted to vary the proportion of radiator surface exposed to the air which cools the same. In the past, however, these devices have generally been manually operated.

One of the objects of the present invention is to provide a device for automatically operating the curtains or shutters of the radiator in accordance with variations in the temperature of the cooling water in the radiator.

Another object of the invention is to provide a device of this type which will permit the curtains or shutters to assume positions intermediate the fully open and fully closed position, and to remain in such intermediate positions when the operating means are not in action.

More particularly, my invention relates to a motor, and preferably an electric motor, which is connected to the radiator covering means by an irreversible connection so that when the motor is not driven the shutter or curtain will remain in that position which it had assumed when the motor stopped, whether such position be fully open or closed or at some point between the open and closed positions.

Further objects and advantages will appear more fully from the following description, particularly when taken in conjunction with the accompanying drawings which form a part thereof.

Figure 1:
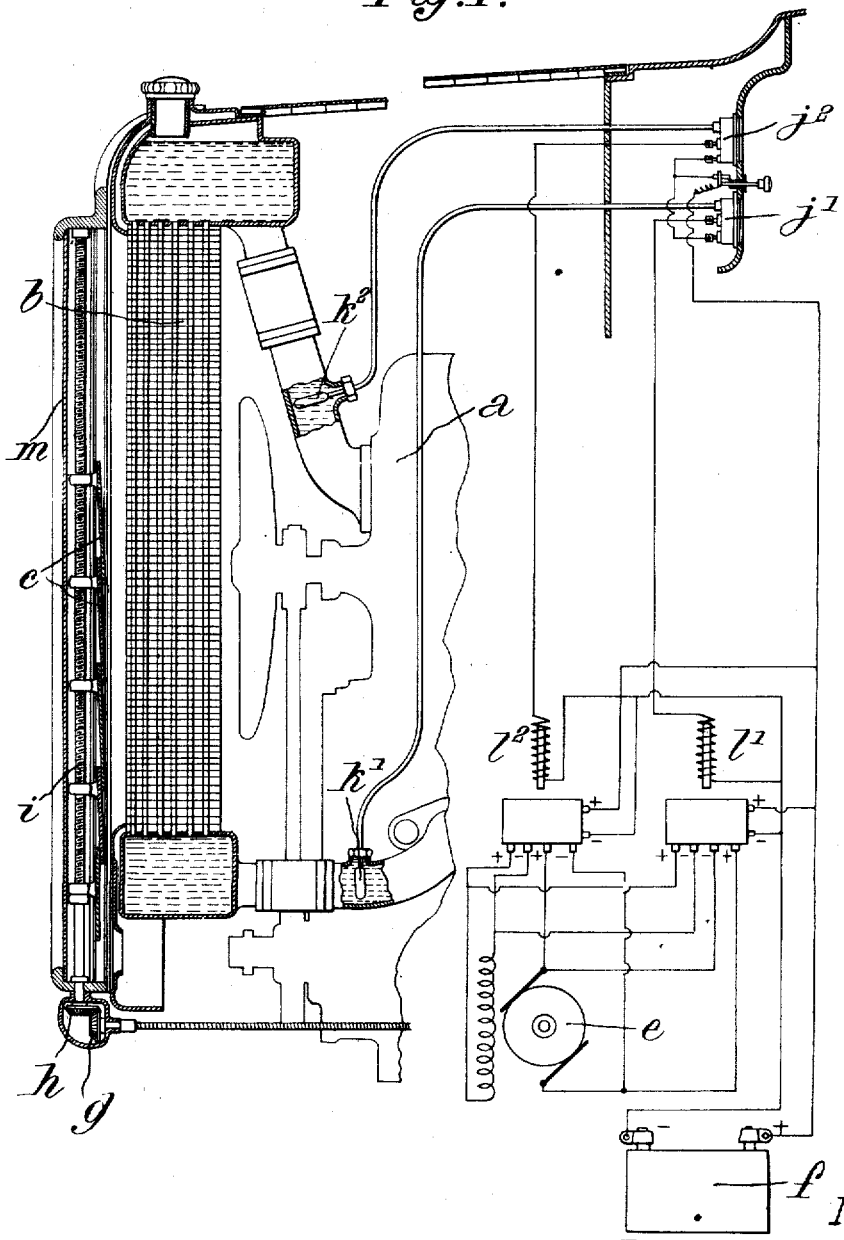
Fig. 1 is a side elevation, partly in section, of one embodiment of the invention.
Figure 2:
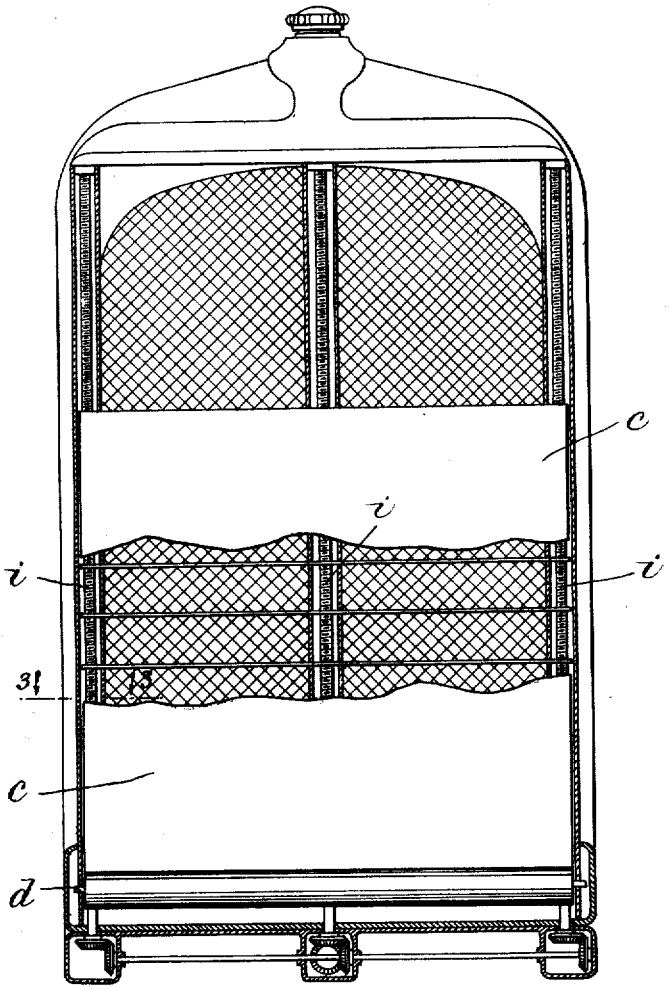
Fig. 2 is a front view, partly in section, of the arrangement shown in Fig. 1.
Figure 3:
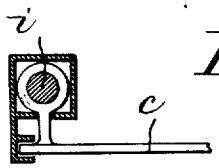
Fig. 3 is a cross section on the line 3—3 of Fig. 2.

As shown in Figs. 1 to 3, the invention is applied to an engine having a cylinder block *a* provided with a water jacket which communicates at its top and bottom in the usual manner with a conventional radiator *b*. The amount of air which strikes and passes through the radiator *b* may be regulated by a plurality of shutter sections *c*. These sections are moved up or down by nuts provided on their ends which engage with threaded shafts *i*. The shafts *i* are rotated simultaneously by means of suitable gearing including bevelled gears *g* and *h* from a motor *e* which is connected to bevel gear *g* by suitable shafts. The motor *e* is controlled by thermostats $k^1$ and $k^2$, preferably of the water vapor type, which act to close switches $j^1$ and $j^2$ respectively when the temperature of the water in contact with the element $k^1$ falls below a temperature $t^1$ or when that in contact with element $k^2$ exceeds a temperature $t^2$. The switches $j^1$ and $j^2$ are connected to solenoids or relays $l^1$ and $l^2$ which act to control the motor *e* so as to cause it to rotate in one direction or the other as the solenoids are operated. Current is supplied to the electric circuits and to the motor by battery *f*.

The radiator covering mechanism is preferably protected by a grill *m* in front of the shutter *c*.

The operation of the arrangement described above should be evident from the description. If the vehicle is at rest and shutter *c* is in the lowered or open position, motor *e* may be started by means of a manual mechanism which operates switch $j^1$. The shutter will then rise and reduce the effective cooling surface of the radiator, and this will cause a rise in the temperature of the water circulating therethrough. When the water reaches the temperature $t^1$, thermometer $k^1$ will cause switch $j^1$ to open and motor *e* will stop turning. The shutter will remain in the position which it has reached, whether this position be intermediate the fully open and closed positions or not because of the coaction of the nuts on the shutter with the threaded shafts *i*, which form an irreversible reduction gearing connection between the motor and the shutters. If the water continues to heat up, and its temperature reaches temperature $t^2$, thermometer $k^2$ will cause switch $j^2$ to close and motor *e* will rotate in the opposite direction to lower shutters *c*. This lowering action will continue until the temperature drops below $t^2$ when the motor will stop and the shutter will remain in the position to which it has been moved. It is obvious that the arrangement will act to keep the water in the cooling system between the predetermined temperature limits $t^1$ and $t^2$.

Figure 4:
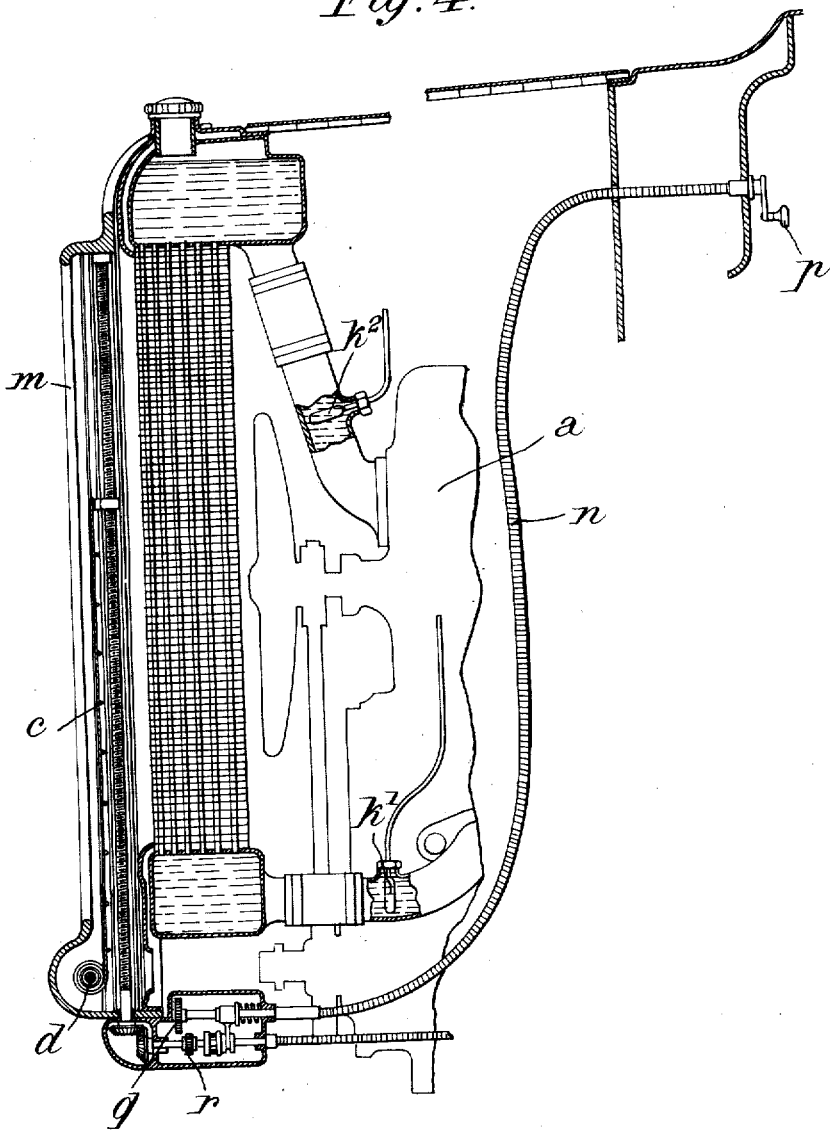
Fig. 4 shows in side elevation, partly in section, another embodiment of the invention.

In the modification of the invention shown in Fig. 4, the shutters are replaced by a curtain *c* which winds on a spring actuated roller *d*. Roller *d* tends to keep the curtain in rolled or lowered position, and the curtain is moved upward by the action of a nut which is connected to the curtain and engages a threaded shaft *i*. The remainder of this arrangement and the operation thereof are similar to the device shown in Figs. 1 to 3.

However, I further provide a manual means for raising or lowering the curtain *c*. For instance, a crank *p* mounted on the instrument board of the vehicle is connected to a flexible shaft *m* which is capable of movement to bring gears *q* and *r* into and out of engagement with each other. In this manner, the shaft *m* may be connected to the threaded shaft *i* to turn the same in either direction. During normal operation, however, no such connection will be present and the shaft *i* will be operated by the motor.

In the claims, the terms "shutter" or "shutter means" are to be taken as covering generically curtains *c* as shown in Fig. 4, shutters *c* as shown in Fig. 1, or equivalent elements, movably mounted in any manner adjacent a radiator and having the same function.

While I have described herein what I determine to be practical and efficient embodiments of my invention, it should be well understood that I do not wish to be limited thereto as changes might be made in the arrangement, disposition and shape of the parts without departing from the principle of my invention as comprehended within the scope of the appended claims; for example, electric motor *e* has been shown only as an example of a movable device capable of actuating the shutter.

I claim:

1. In combination with a motor provided with a radiator adapted to contain a cooling fluid, a threaded shaft, a shutter provided with a nut threadedly engaging with said shaft, said shutter being positioned to move in front of said radiator, a motor connected in driving relation to said threaded shaft, a thermometer positioned to respond to variations in the temperature of the cooling fluid circulating through said radiator and a switch controlled by said thermometer and controlling said motor.

2. In combination with a motor provided with a radiator adapted to contain a cooling fluid, a threaded shaft, a shutter provided with a nut threadedly engaging with said shaft, said shutter being positioned to move in front of said radiator, an electric motor connected in driving relation to said threaded shaft, a thermometer positioned to respond to variations in the temperature of the cooling fluid circulating through said radiator, and an electric switch controlled by said thermometer and controlling said electric motor.

3. In combination with a vehicle having a cooling system including a radiator, shutter means for regulating the flow of cooling air to said radiator, and means for operating said shutter means, said operating means comprising a movable member, means controlled by the temperature of the water in the cooling system to move said member in one direction when the temperature drops below a predetermined minimum and in the other direction when the temperature exceeds a predetermined maximum, said moving means being stationary when the temperature is between said minimum and maximum, and said member and said shutter means, said connecting means transmitting movement from said member to said shutter means but being incapable of transmitting movement from said shutter means to said member whereby said shutter means may maintain an intermediate position between its open and closed positions when said moving means is inoperative.

4. In combination with a vehicle having a cooling system including a radiator, shutter means for regulating the flow of cooling air to said radiator, and means for moving said shutter means in a direction to open or close the same, said moving means comprising means controlled by the temperature of the water in the cooling system to move said shutter means towards closed position when the temperature drops below a predetermined minimum and towards open position when the temperature exceeds a predetermined maximum, means connecting said moving means to said shutter means including threadedly engaging members one of which is driven by said moving means, and one of which is connected to said shutter means, whereby said shutter means is held in intermediate positions when said moving means is inoperative.

5. In combination with a vehicle having a cooling system including a radiator, shutter means for regulating the flow of cooling air to said radiator, and means for moving said shutter means in a direction to open or close the same, said moving means comprising means controlled by the temperature of the water in the cooling system to move said shutter means towards closed position when the temperature drops below a predetermined minimum and towards open position when the temperature exceeds a predetermined maximum, said moving means comprising an electric motor, means connecting said motor to said shutter means including threadedly engaging members one of which is driven by said motor, and one of which is connected to said shutter means, whereby said shutter means is held in intermediate positions when said moving means is inoperative.

6. In combination with a motor provided with a radiator adapted to contain a cooling fluid, a threaded shaft, a shutter provided with a nut threadedly engaging with said shaft, said shutter being positioned to move in front of said radiator, a motor connected in driving relation to said threaded shaft, and means responsive to variations in the temperature of the cooling fluid to control said motor to cause the same to turn said shaft in one direction or the other as the temperature exceeds a predetermined maximum or falls below a predetermined minimum and, between such maximum and minimum, to be inoperative to turn said shaft.

7. In combination with a vehicle having a cooling system including a radiator, shutter means for regulating the flow of cooling air to said radiator, and means for moving said shutter means in a direction to open or close the same, said moving means including a rotatable shaft, a one-way reduction gearing connecting said shaft and said shutter means, said gearing transmitting movement from said shaft to said shutter means but being incapable of transmitting movement from said shutter means to said shaft, a motor connected to said shaft to drive the same, and means responsive to variations in the temperature of the cooling fluid to control said motor to cause the same to turn said shaft in one direction or the other as the temperature exceeds a predetermined maximum or falls below a predetermined minimum and, between such maximum and minimum, to be inoperative to turn said shaft.

JEAN GEORGES DINTILHAC.